(12) United States Patent
Perrier et al.

(10) Patent No.: US 6,418,710 B1
(45) Date of Patent: Jul. 16, 2002

(54) DEPLOYABLE DIVERGING PART FOR A THRUSTER

(75) Inventors: Bruno Perrier, Saint-Medard-En-Jalles; Jean-Luc Sans, Pessac; Laurent Collignon, Andernos, all of (FR)

(73) Assignee: Societe Nationale d'Etude et de Construction de Moteurs d'Aviation - S.N.E.C.M.A., Paris (FR)

( * ) Notice: Subject to any disclaimer, the term of this patent is extended or adjusted under 35 U.S.C. 154(b) by 0 days.

(21) Appl. No.: 09/331,540
(22) PCT Filed: Dec. 24, 1997
(86) PCT No.: PCT/FR97/02425
§ 371 (c)(1),
(2), (4) Date: Jun. 23, 1999
(87) PCT Pub. No.: WO98/28533
PCT Pub. Date: Jul. 2, 1998

(30) Foreign Application Priority Data

Dec. 24, 1996 (FR) .............................................. 96 15958

(51) Int. Cl.⁷ ................................................ F02K 1/00
(52) U.S. Cl. ...................................................... 60/271
(58) Field of Search ........................ 60/271; 239/265.11, 239/265.15, 265.33, 265.43

(56) References Cited

U.S. PATENT DOCUMENTS 3,237,402 A  * 3/1966  Steverding ................... 60/35.6
3,526,365 A  * 9/1970  Paine ..................... 239/265.43
3,776,466 A  * 12/1973  Ray ........................ 239/265.15
4,022,129 A  * 5/1977  Day et al. .................. 102/49.5
4,272,956 A  * 6/1981  Lamere et al. ................ 60/242
4,779,799 A  10/1988  Jencek

FOREIGN PATENT DOCUMENTS

| EP | 0516519 | 12/1992 |
|----|---------|---------|
| EP | 0661436 | 7/1995 |
| FR | 2503794 | 10/1982 |
| FR | 2724979 | 3/1996 |
| GB | 2029511 | 3/1980 |
| GB | 2029511 A * | 3/1980 |

* cited by examiner

Primary Examiner—Charles G. Freay
Assistant Examiner—William H Rodriguez
(74) Attorney, Agent, or Firm—Weingarten, Schurgin, Gagnebin & Lebovici LLP (57) ABSTRACT

A diverging ring is displaceable between a retracted position in which it surrounds a first portion of a diverging part and a deployed position in which it is connected to a downstream end of the first portion. A deployment mechanism causes the diverging ring to move from its retracted position to its deployed position under drive from an actuator. A temporary structure, or "insert", is placed inside the diverging ring so as to transform the diverging section thereof into a non-diverging section, at least over the major portion of the length of the diverging ring, the insert being eliminatable on or after the diverging ring coming into its deployed position.

21 Claims, 5 Drawing Sheets

DEPLOYABLE DIVERGING PART FOR A THRUSTER

The present invention relates to a deployable diverging part for a thruster.

BACKGROUND OF THE INVENTION

It is well known in a thruster, in particular in a second or third stage of a multistage launcher, to use a rocket engine nozzle that has a deployable diverging part. The idea is that by deploying the diverging part in flight, the outlet section of the nozzle can be adapted as a function of ambient pressure, which ambient pressure diminishes from low altitudes close to the ground to high altitudes on leaving the earth's atmosphere. As a result, optimum thrust can be obtained at altitude while limiting size on the ground.

Usually, a deployable diverging part comprises a first portion which constitutes the entire diverging part in its initial configuration and which can be lengthened by installing one or more diverging rings. The or each diverging ring is moved from a retracted position in which it surrounds the first portion of the diverging part to a deployed position in which it connects to the downstream end of the first portion or of a previously-installed diverging ring.

Various mechanisms have been proposed, all of which seek to ensure that deployment takes place automatically and reliably with a minimum expenditure of energy. Deployment mechanisms based on articulated arms are described in particular in document EP-A-0 516 519 and in French patent application FR-2743110 in the name of the Assignee. Other mechanisms, e.g. based on telescopic arms, on screws, on roll-out beams, or on membranes are also known.

The deployment mechanism can be activated by actuator means that do not require an external energy source, e.g. spring devices, or by means such as actuators or motors which require a source of electrical or hydraulic energy or indeed a gas generator.

Spring devices are used when deployment takes place prior to ignition, however they turn out generally to be inadequate for achieving reliable deployment after ignition because of the action of the ejected gases. It is then necessary to use motors or actuators that develop higher power.

BRIEF SUMMARY OF THE INVENTION

It is desirable for the energy requirements to be kept as small as possible, and the present invention seeks specifically to provide a deployable diverging part that requires only a small amount of power for deployment, and that can therefore be deployed after ignition without recourse to an external energy source, e.g. merely by means of springs.

This object is achieved by a deployable diverging part for a thruster, the part comprising a first portion, at least one second portion in the form of diverging ring displaceable between a retracted position in which it surrounds the first portion and a deployed position in which it is connected to a downstream end of the first portion, a deployment mechanism capable of causing the first diverging ring to pass from its retracted position to its deployed position, and actuation means for actuating the deployment mechanism, the diverging part being characterized in that a temporary structure, or "insert", is disposed inside the diverging ring so as to transform the diverging section thereof into a non-diverging section, at least over the major fraction of the length of the diverging ring, the insert being eliminatable on or after the diverging ring coming into its deployed position.

By offering a surface that is non-diverging, and which is preferably substantially cylindrical, to the combustion gas flowing in the diverging part, the insert makes it possible to reduce considerably the amplitude of the axial force component acting on the diverging ring and opposing deployment thereof, i.e. the component that is directed upstream (in the present text, the terms "upstream" and "downstream" are used relative to the flow direction of the combustion gas in the diverging part).

Since the deployment force is considerably reduced, it is possible to use energy storage means for actuation purposes, e.g. spring devices, without any connection to an external energy source, even for deploying the diverging part after ignition.

When the diverging part has a plurality of deployable diverging rings associated with respective deployment mechanisms and actuation means, each diverging ring is advantageously provided with its own insert.

The insert can be connected to the diverging ring by mechanical link means which are released or broken on or after the diverging ring coming into its deployed position so as to enable the insert to be expelled. The link means are advantageously released by means of at least one release member that is displaceable between a first position in which the link means are locked and a second position in which the link means are released, the release member optionally being moved automatically by contact with the diverging part when the diverging ring comes into its deployed position. The link means can be broken by pyrotechnic means, after the diverging ring has come into its deployed position.

In a variant, the insert is connected to the diverging ring by link means that are made at least in part out of a material of strength that is ephemeral in the combustion gas flowing through the diverging part, thus enabling it to be eliminated after the diverging ring has come into its deployed position, so as to enable the insert to be expelled.

Advantageously, at least one spring element is interposed between the inside wall of the diverging ring and the insert and it applies a force on the insert that has at least an axial component directly downstream so as to facilitate expulsion of the insert after the link means have been released, broken, or eliminated.

In yet another variant, the insert itself is made at least in part out of a material whose strength is ephemeral in the combustion gas flowing through the diverging part, so that it is eliminated after the diverging ring has come into its deployed position.

BRIEF DESCRIPTION OF THE DRAWINGS

The invention will be better understood on reading the following description given by way of non-limiting indication and with reference to the accompanying drawings, in which.

DETAILED DESCRIPTION OF THE INVENTION

Figure 2:
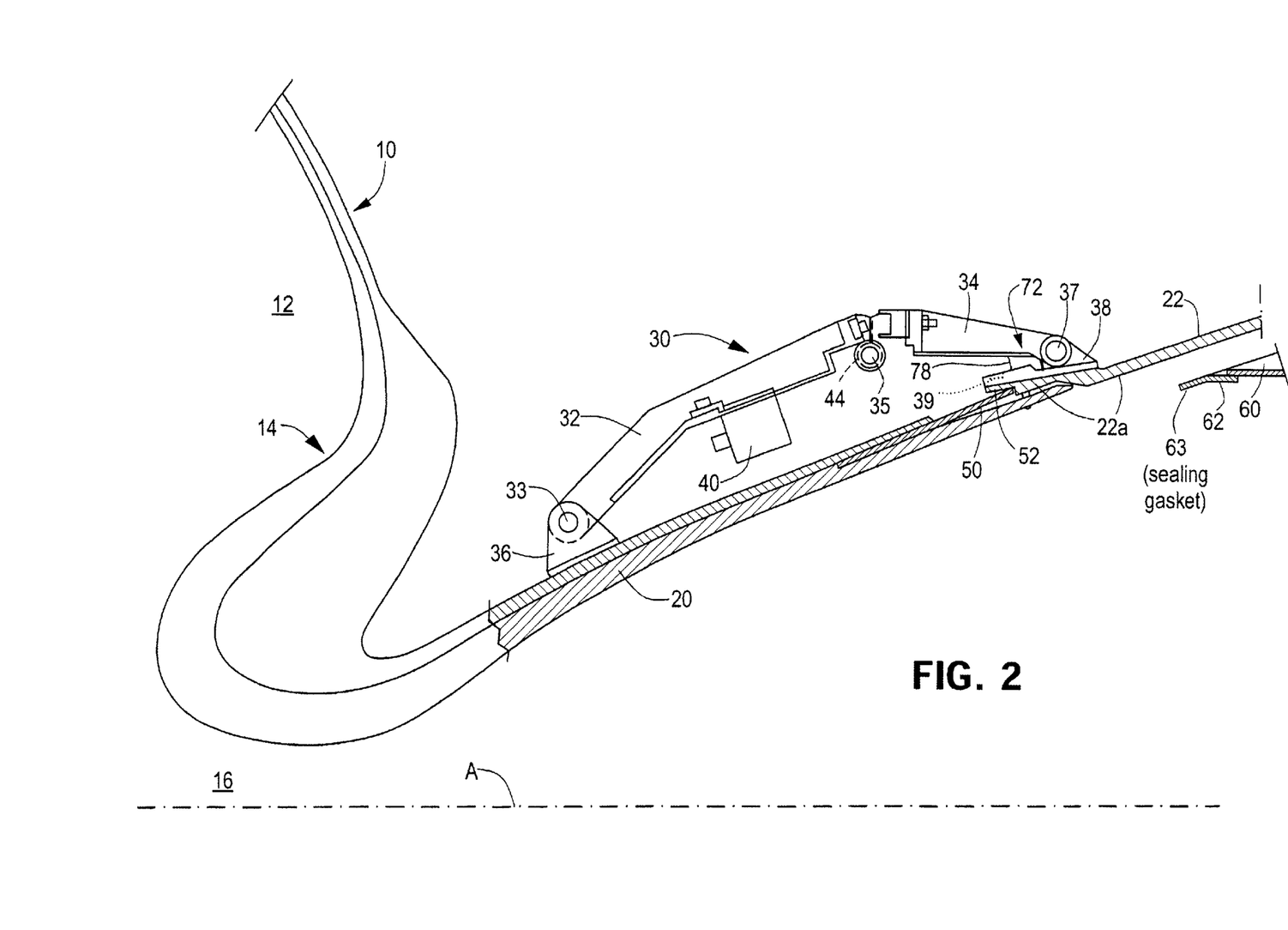

In FIG. 2, reference 10 designates a thruster body or thruster stage, e.g. using solid fuel, and having a combustion chamber 12. The chamber opens out through an end wall 14 via a nozzle throat 16 that is extended by a first portion 20 of a deployable diverging part.

The upstream end of the portion 20 and the nozzle throat 16 are connected to the end wall 14 via a cone if the nozzle is fixed, or if the nozzle is hinged, via a flexible abutment, for example.

The body 10, the end wall 14, the throat 16, and the portion 20 are coated in ablative material to provide thermal protection.

The deployable diverging part further comprises a diverging ring 22 that is displaceable between a retracted position (FIG. 1) where it surrounds the first portion 20 of the diverging part and having the same axis A, and a deployed position in which it is connected and locked to the downstream end of the first portion 20, extending it so as to form a diverging part having an outlet diameter that is enlarged (FIG. 2).

Figure 1:
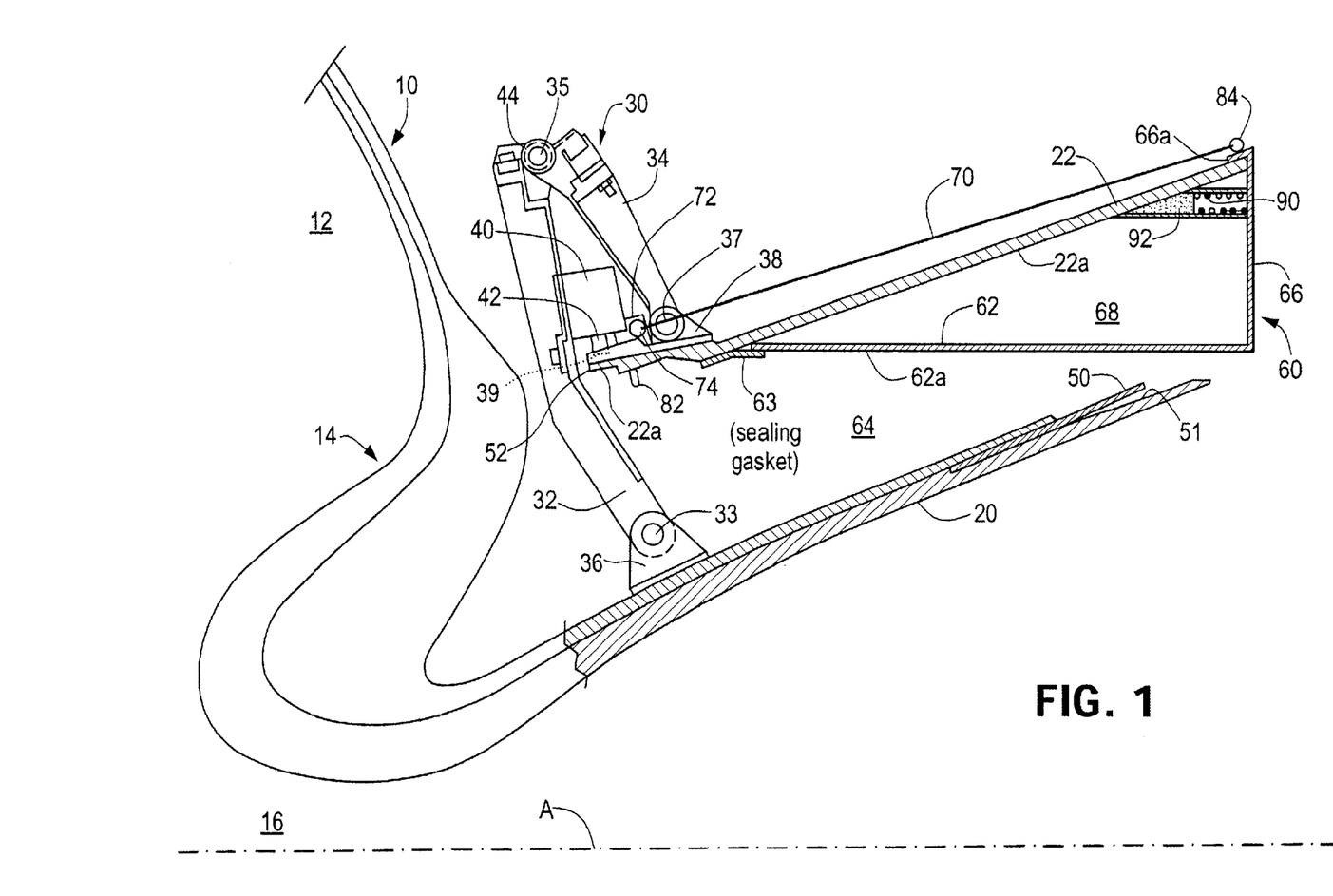
FIGS. 1 and 2 are half-views in meridian section of a deployable diverging part constituting an embodiment of the invention, respectively before and after deployment of a diverging ring.

The diverging ring 22 is held in its retracted position and it is guided into its deployed position by means of four articulated arms 30 that are regularly distributed around the first portion 20 of the diverging part.

Each arm 30 has a first segment 32 that is hinged at a first end to a plate 36 fixed to the outside wall of the first portion 20 (via a pin 33) and, at a second end, to a first end of the second segment 34 (via a pin 35). At its second end, the segment 34 is hinged to a plate 38 which is fixed to the outside wall of the diverging ring (via a pin 37). The hinge pins 33, 35, and 37 at the ends of the segments 32 and 34 extend perpendicularly to the axis A. As shown in FIG. 1, a device for locking the arm in the retracted position comprises an abutment 40 secured to the segment 32 and provided with a stud 42 which penetrates into a housing 39 in the plate 38. In order to release the arm 30, the stud 42 can be extracted from the housing 39 by pneumatic means, e.g. by connecting the stud to the piston of a pneumatic actuator, or else by pyrotechnic means. It is not necessary to provide a locking device on each arm 30, locking a single arm can suffice to keep the assembly in the retracted position.

When the arm 30 is released, it can deploy with the segments 32 and 34 rotating about the hinge pins at their ends.

The arm 30 is deployed by means of a torsion spring 44 mounted on the hinge pin 33 and driving an outlet pin engaged with the segment 32.

To deploy the diverging ring 22, the four arms 30 are released simultaneously by unlocking the studs 42. When released in this way, the springs 44 cause the arm segments 32 to rotate simultaneously, thereby deploying the arms simultaneously.

It will be observed that the assembly formed by the four arms 30 and the diverging ring 22 is hyperstatic, which means that the diverging ring 22 moves without deforming and while remaining constantly centered on the axis A. The hyperstatic nature of the assembly thus ensures that the diverging ring 22 is guided accurately towards its deployed position, and the arms are prevented from moving out of synchronization. It will be observed that this result can still be obtained when torsion springs are mounted on some of the arms only, or indeed on one arm only.

Means are provided at the periphery of the downstream end of the portion 20 of the diverging part and at the periphery of the upstream end of the diverging ring 22 to provide mutual locking thereof when the diverging ring reaches the deployed position.

In the example shown, these locking means are constituted by a plurality of flexible tongues 50 which are fixed to the periphery of the downstream end of the portion 20 on the outside, and by an annular setback 52 formed at the upstream end of the diverging ring 22 on its inside.

When the diverging ring 22 comes close to its fully-deployed position, the inside wall 22a of the diverging ring 22 bears against the tongues 50, causing them to bend towards the axis of the diverging part. To this end, the free end portions of the tongues 50 leave a gap 51 relative to the outside wall of the portion 20.

The positions of the tongues 50 and of the setback 52 are designed so that the tongues snap into the setback 52 once the diverging ring 22 reaches its deployed position. This locks the diverging ring 22 relative to the portion 20. It will be observed that the accuracy provided by the hyperstatic assembly makes it possible to use this automatic method of locking. It will also be observed that the setback 52 could be replaced by a plurality of housings corresponding to respective tongues 50.

A deployable diverging part having a deployment mechanism constituted by a hyperstatic assembly of articulated arms with the diverging ring being locked when deployed to the end of the first portion of the diverging part is described in the Assignee's French patent application FR-2743110.

In accordance with the present invention, the diverging ring 22 is also provided with a temporary structure or "insert" 60 which is placed inside the diverging ring so as to transform the diverging section formed by the inside wall 22a of the diverging ring into a non-diverging section, at least over the major portion of the length of the diverging ring. The insert 60 is mounted and/or designed in such a manner as to be suitable for being completely eliminated on or immediately after the diverging ring 22 coming into its deployed position.

In the embodiment of FIGS. 1 and 2, the insert 60 comprises a rigid tubular portion 62 whose inside wall 62a defines a non-diverging section 64. The tubular portion 62 has the same axis as the diverging ring 22 and it extends over practically the entire length of the diverging ring from a location situated immediately downstream from the upstream portion of the diverging ring 22 which is to fit over the end of the portion 20 of the nozzle at the end of deployment. A sealing gasket 63 provides sealing between the upstream end of the tubular portion 62 and the inside wall of the diverging ring 22. The inside diameter of the tubular portion is substantially constant and equal to that of the upstream end of the diverging ring 22, thus defining a cylindrical section 64 of diameter substantially equal to that at the outlet of the portion 20 of the diverging part.

The tubular portion 62 is connected to the downstream end of the diverging ring by an annular end plate 66 extending perpendicularly to the axis of the diverging ring 22. Stiffeners in the form of triangular plates 68 are distributed around the tubular portion 62. The stiffeners are placed in radial planes between the outside wall of the tubular portion 62 and the inside wall 22a of the spring 22. The link between the tubular portion 62, the end plate 66 and the stiffeners 68 can be provided by adhesive or by welding, for example, with these various elements constituting the insert being made, for example, out of metal such as aluminum. The insert can then be provided on its wall defining the cylindrical section 64 with thermal protection, e.g. constituted by a sheet of elastomer stuck thereto. Other materials could be used, e.g. composite materials reinforced by fibers of glass or carbon, for example, and having a resin matrix, e.g. a phenolic or an epoxy resin.

The presence of the insert 60 serves to greatly reduce the axial forces that oppose deployment during displacement of the diverging ring and due to the combustion gas flowing through the diverging part.

Figure 3:
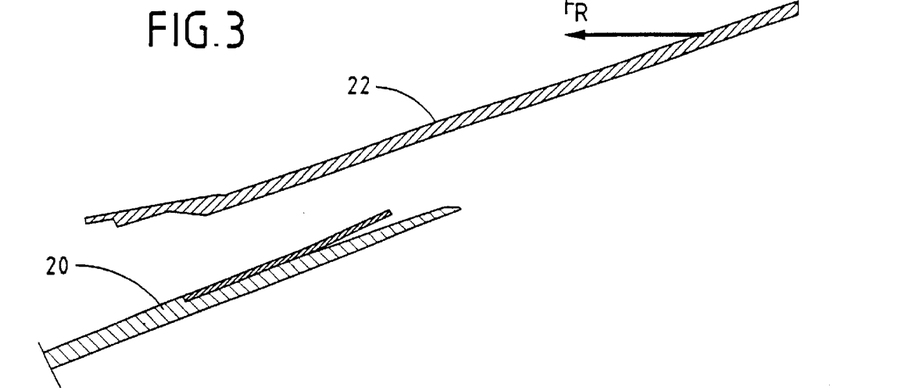
FIGS. 3 and 4 are diagrams showing the action of the combustion gas flowing through the diverging part on a diverging ring while it is being deployed, respectively in a prior art deployable diverging part and in the deployable diverging part of FIGS. 1 and 2.

In the absence of a deployment insert, as shown diagrammatically in FIG. 3, the combustion gas jet exerts force on the inside face 22a of the diverging ring 22 that is being deployed giving rise to an axial component $F_R$ which is directed upstream, i.e. which opposes deployment. Under such circumstances, energy storage actuator means, such as spring devices, can turn out to be insufficient, and the power required must be supplied by electrical or hydraulic motors or actuators connected to an external energy source.

Figure 4:
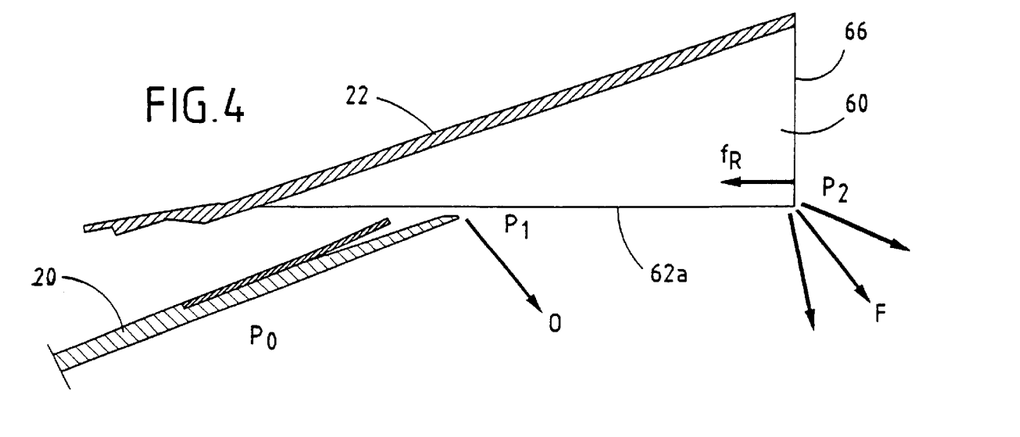

However, when the deployment insert is present (FIG. 4) and penetrates into the combustion gas jet, a shockwave O is established followed by expansion fronts $F_D$ at the downstream end of the diverging ring 22. On the portion of the inside wall 62a of the insert that is exposed to the jet, the speed of the gas drops and the pressure $P_1$ is greater than the pressure $P_0$ acting on the inside face of the portion 20 of the diverging part. Since this pressure is acting on a cylindrical surface, it does not induce any axial force component directed upstream that could oppose deployment. At the downstream end of the diverging ring 22, the gas speed increases sharply, but the pressure $P_2$ decreases. As a result any pressure acting upstream on the outside face of the end wall 66 of the insert will be small, and thus any axial force component $f_R$ opposing deployment will be of small amplitude. For this reason, deployment can easily be performed by the torsion spring(s) 44. The ability to actuate the deployment mechanism by energy storage means that are not connected to an external energy source, or possibly by electric or hydraulic motor means that are of low power, constitutes an essential advantage of the invention.

In the embodiment of FIGS. 1 and 2, the insert 60 defines a cylindrical section 64. It could even converge slightly so as to give the tubular portion 62 a slightly tapering shape. In which case, the pressure $P_1$ would induce an axial force component on the diverging ring 22 during deployment, but directed downstream, thus assisting deployment. Nevertheless, any convergence of the section 64 must remain sufficiently small to avoid disturbing the jet of combustion gas, so as to avoid exerting excessive force on the deployment mechanism, and so as to avoid impeding snap-fastening of the diverging ring at the end of deployment.

Figure 5:
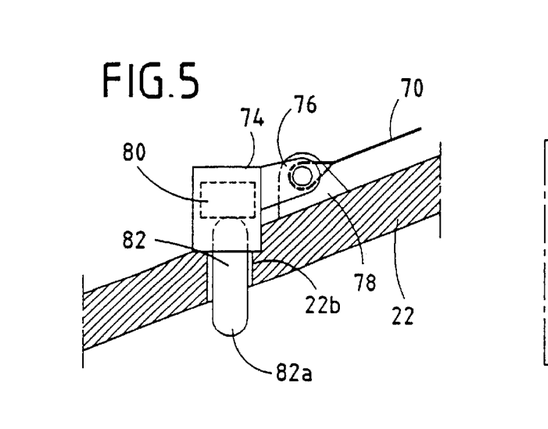
FIGS. 5 and 6 are detail views on a larger scale showing the mechanical link between the diverging ring and the insert in the embodiments of FIGS. 1 and 2.
Figure 6:
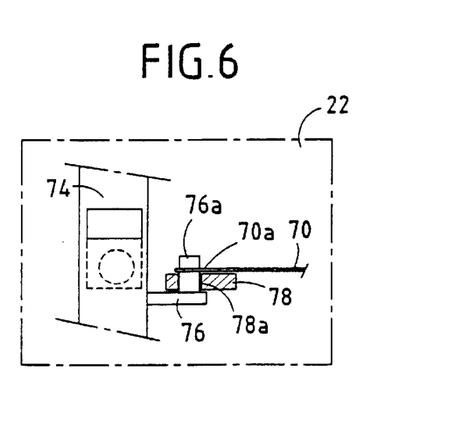

FIGS. 5 and 6 show the mechanical link between the insert 20 and the diverging ring 22 in greater detail, respectively in section and in plan view. This mechanical link is made in such a manner as to release automatically at the moment the diverging ring 22 comes into its deployed position, so that the insert can then be ejected from the diverging part.

The mechanical link has straps 70, e.g. four straps, that are regularly distributed around the axis of the diverging ring 22. Each strap 70, e.g. made of steel, extends in a radial plane. It is connected at a first end to a first anchor device 72 on the outside of the diverging ring 22 in the vicinity of its upstream end. At its other end, each strap is connected to the end plate 66 of the insert, by means of an eye 84 fixed to a rim 66a on the end plate 66, on the outside periphery thereof.

The anchor device 72 comprises a band 74, e.g. of steel surrounding the diverging ring 22. The band 74 has four hooks 76 angularly distributed around the diverging ring 22. Each hook 76 has its finger-shaped end 76a guided through a hole 78a in a plate 78 fixed to the outside wall of the diverging ring 22, each finger 76a extending substantially in a circumferential direction. At its first end, each strap 70 is secured to the end of a finger 76a that projects through the corresponding plate 78. The band 74 is of channel section, being open towards the outside surface of the diverging ring 22. Inside, the band 74 has a plurality of walls 80 extending perpendicularly to its side walls. The walls 80 are inclined, e.g. at about 45° relative to a meridian plane situated level therewith, and they form ramps against which the ends of fingers or feelers 82 bear. Each feeler 82 passes through the wall of the diverging ring 22 via a radial hole 22b and has an end 82a projecting into the inside of the diverging ring 22.

Each strap can have a tensioner mounted between its ends.

When the diverging ring 22 reaches its deployed position, the ends 82a of the feelers 82 are pushed back by coming into contact with the outside wall of the portion 20 of the diverging part, and by pressing against the ramps 80 they cause the band 74 to rotate around the diverging ring 22. The hooks 76 move with the band 74 so the fingers 76a are extracted from the holes 78a, thereby releasing the straps 70. The band 74 ensures that the straps are unlocked synchronously.

Since the insert 60 is no longer retained, it is ejected from the diverging part by the jet of combustion gas together with the straps 70. In order to facilitate such ejection, one or more springs 90 are precompressed between the inside face of the end plate 66 and a bearing surface 92 made of rigid foam which bears against the inside face 22a of the diverging ring 22. The spring 90 and the bearing surface 92 are housed in a tube, e.g. made of aluminum and stuck to the end plate 66. At its end remote from its end that is in contact with the spring 90, the bearing surface 92 is shaped so as to match substantially the shape of the inside surface 22a of the diverging ring 22.

Figure 7:
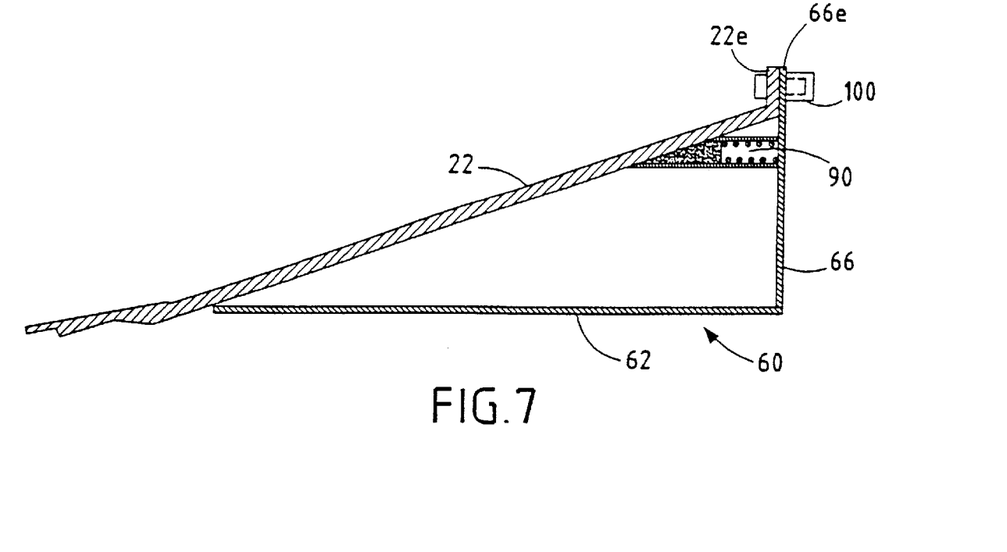
FIGS. 7 to 9 are half-views in meridian section showing different embodiments of and fixings for an insert in a diverging ring in various embodiments of a deployable diverging part of the invention.

FIG. 7 is a diagram showing another embodiment for the mechanical link between the insert 60 and the diverging ring 22, in which rupture of the link is provided by pyrotechnic means. The end plate 66 of the insert is extended at its periphery by a rim 66c which bears against a rim 22e at the downstream end of the diverging ring 22. The link between the insert 60 and the diverging ring is provided by explosive bolts 100 which interconnect the rims 66e and 22e around the axis of the diverging ring.

When the diverging ring 22 reaches its deployed position and snap-fastens on the fixed portion of the diverging part, the bolts 100 are caused to destruct. The insert 60 is then ejected, with help from ejection springs 90.

Figure 8:
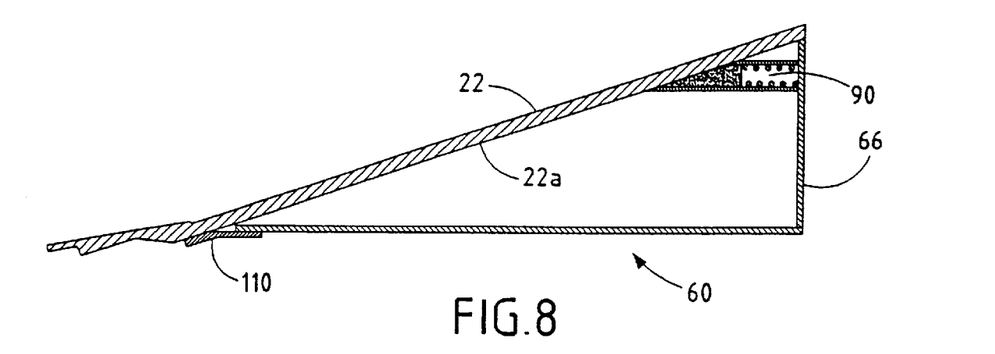

In the embodiment of FIG. 8, the insert 80 is fixed to the inside of the diverging ring 22 by means of a strip 110 which is stuck both to the inside surface 62a of the insert, and upstream therefrom to the inside surface 22a of the diverging ring 22. The strip 110 is made of a material that is destroyed progressively by the combustion gas flowing through the nozzle, starting from when it is subjected to the action of said gas, i.e. when the diverging ring 22 comes into its deployed position. For example, it is possible to use a strip of thermo-plastic resin, e.g. PVC.

When the strip 110 is destroyed, the insert 60 is released and is ejected with the assistance of ejection springs 90.

Figure 9:
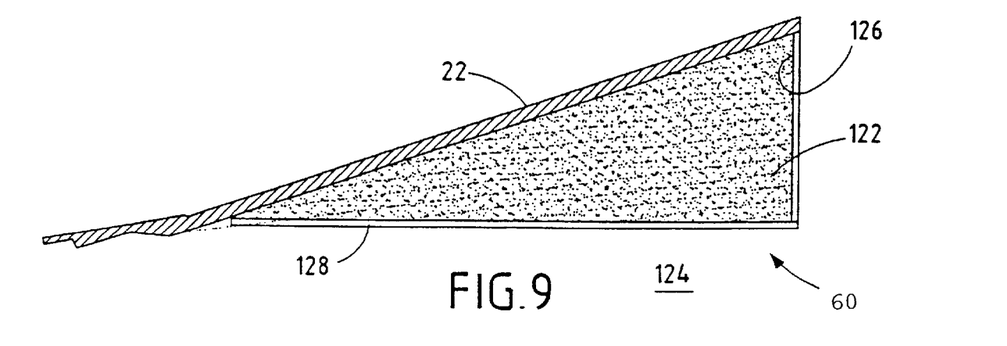

In another embodiment shown in FIG. 9, the diverging ring 22 is provided with an insert 120 that is essentially constituted by a block 122 of material that is destroyed by the combustion gas flowing through the nozzle, e.g. a thermo-degradable foam such as polyurethane. The block 122 is stuck to the inside face of the diverging ring 22. It can be fitted on its inside surface defining the cylindrical section 124 and on its end surface 160 with a stuck-on cover 128 that protects the insert until it is used. The cover 128 is also made of a material that is consumed or sublimed by the combustion gas.

In the above, it has been assumed that the nozzle has only one deployable diverging ring. The invention is also applicable to nozzles having a plurality of diverging rings designed to be deployed successively or simultaneously while the thruster is in flight.

Figure 10:
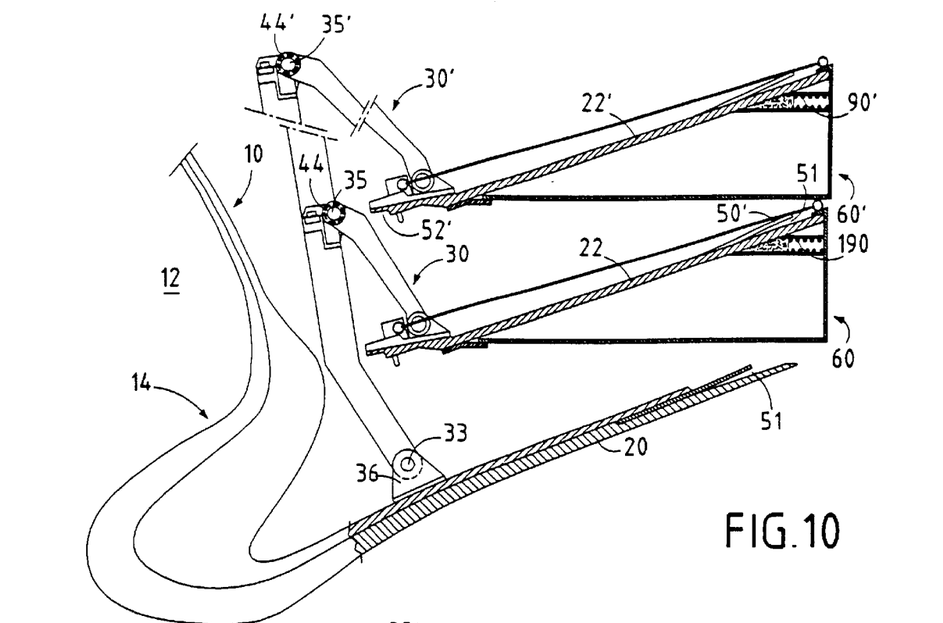
FIGS. 10 and 11 are highly diagrammatic half-views in meridian section showing two other embodiments of a deployable diverging part of the invention, in their initial configuration.

FIG. 10 shows a nozzle having two deployable diverging rings in the retracted state. This nozzle differs from that of FIGS. 1 and 2 merely by the addition of a second deployable diverging ring 22' fitted with its own deployment mechanism and its own actuation means, and by the fact that the first diverging ring 22 is shaped at its downstream end so as to enable the second diverging ring 22' to be locked thereto in the deployed position.

In the fully retracted state (FIG. 10), the diverging ring 22' surrounds the diverging ring 22. It is held in the retracted position by one or more articulated arms 30' which are locked in the folded position, in the same manner as the arms 30. Each arm 30' is fixed at one end to the outside wall of the fixed portion 20 of the diverging part and at its opposite end to the diverging ring 22'. The arms 30' are actuated by one or more torsion springs 44' mounted in hinges 35'. Advantageously, the hinge 35 of each arm 30 is fixed to the portion of the arm 30' which extends between the fixed portion of the diverging part and the hinge 35', such that this portion of the arm is shared by the arms 30 and 30'.

In another possible embodiment (FIG. 11), each arm 30' is fixed at one end of the diverging ring 22 and at its other end to the diverging ring 22', with the hinge connection of the arms 30 and 30' on the diverging ring 22 being common.

The diverging ring 22' is provided with an inset 60' similar to the insert 60 fitted to the diverging ring 22. The link between the insert 60' and the diverging ring 22' and/or the structure of the insert 60 can be similar to those described with reference to FIGS. 5 to 9.

Figure 11:
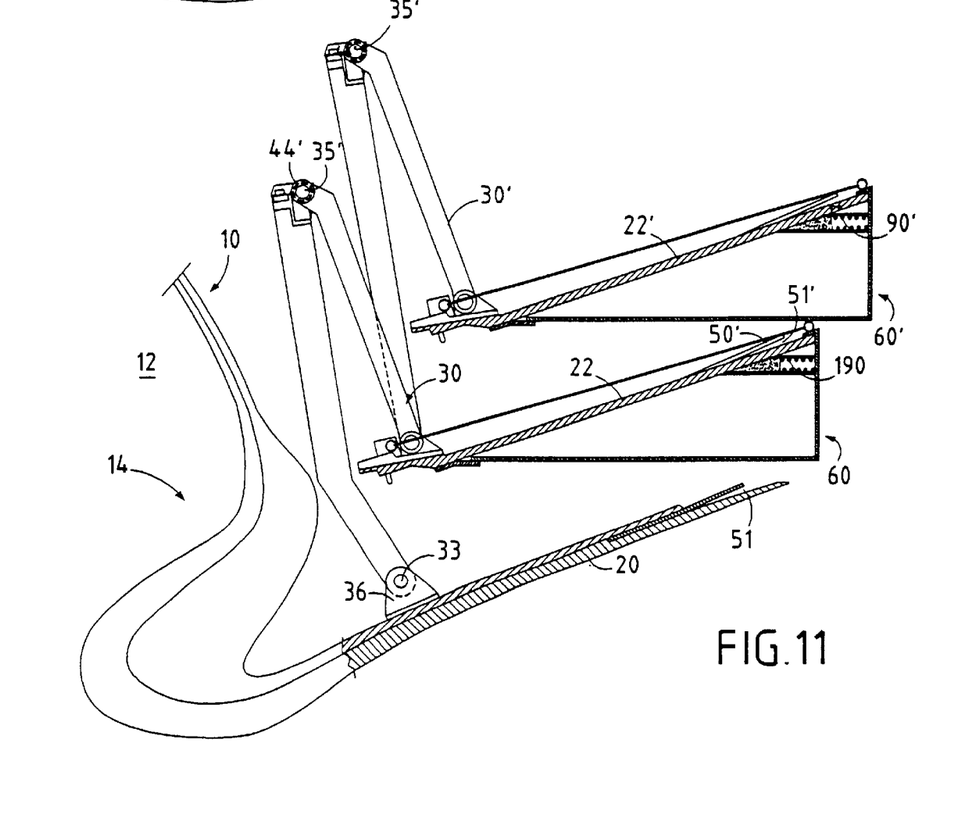

At its downstream end, the diverging ring 22 is provided with locking means constituted by a plurality of flexible tongues 50' designed to co-operate with a setback 52' formed at the upstream end of the diverging ring 22', the tongues 50' leaving for this purpose respective gaps 51' between their free end portions and the outside wall of the diverging ring 22. As a result, the diverging ring 22' can lock to the end of the diverging ring 22 in the same manner as the diverging ring 22 locks to the end of the fixed portion 20 of the diverging part.

The insert 60 is expelled when the diverging ring 22 comes into its deployed position with assistance from ejection springs 90, and the insert 60, is expelled when the diverging ring 22' comes into its deployed position, with the assistance of ejection springs 90' analogous to the springs 90.

The use of a deployment mechanism and deployment means that are specific to the diverging ring 22' makes it possible to deploy this diverging ring after the diverging ring 22 has been deployed and independently of the deployment thereof.

When the additional diverging ring to be connected to the fixed portion 20 of the diverging part needs to be of a length such that problems of size are encountered in the retracted state, then the diverging ring can be subdivided into a plurality of deployable diverging rings which are deployed simultaneously by releasing their actuation means simultaneously.

In the above description, it is assumed that the deployment mechanism is constituted by articulated arms. It will be immediately clear to the person skilled in the art that the invention is applicable to deployable nozzles using a variety of types of deployment mechanism, e.g. telescopic arms, screw arms, arms having roll-out beams, etc., associated with various types of actuation means optionally using an external source of energy.

What is claimed is:

1. A nozzle for a thruster, comprising:

a first fixed nozzle portion;

at least a second nozzle portion in the form of a diverging ring displaceable between a retracted position in which said diverging ring surrounds the first nozzle portion and a deployed position in which said diverging ring is connected to a downstream end of the first nozzle portion;

a deployment mechanism capable of causing said diverging ring to pass from said retracted position to said deployed position;

actuation means for actuating the deployment mechanism;

an insert disposed inside the diverging ring so as to transform a diverging section of said diverging ring into a non-diverging section, at least over the major fraction of the length of the diverging ring;

mechanical link means connecting said insert to the diverging ring; and releasing means for releasing said mechanical link means when or after the diverging ring reaches said deployed position, in order to enable said insert to be expelled.

2. A nozzle according to claim 1, wherein said insert defines a section that is substantially cylindrical.

3. A nozzle according to claim 1, wherein said actuation means comprises energy storage means that is not connected to an external energy source.

4. A nozzle according to claim 1, wherein said actuation comprises spring devices.

5. A nozzle according to claim 1, wherein the mechanical link means comprises at least one fastening member displaceable between a first position in which the diverging ring is retained and a second position in which the diverging ring is released.

6. A nozzle according to claim 5, wherein the fastening member is displaceable automatically under drive from a feeler actuated by coming into contact with the diverging section when the diverging ring comes into said deployed position.

7. A nozzle according to claim 1, wherein said mechanical link means comprises a plurality of fastening members enabling said insert to be retained by a plurality of mechanical link members and said fastening members are mounted on an annular piece surrounding the diverging ring and are automatically displaceable under drive from at least one feeler when the diverging ring comes into said deployed position, so that said mechanical link members are released simultaneously.

8. A nozzle according to claim 1, wherein said releasing means comprises breaking means for breaking said mechanical link means after the diverging ring comes into said deployed position.

9. A nozzle according to claim 8, wherein said beaking means for breaking the mechanical link means are pyrotechnic means.

10. A nozzle according to claim 1, wherein at least one spring element is interposed between an inside wall of the diverging ring and said insert and exerts a force on said insert having at least an axial component directed downstream so as to facilitate expulsion of said insert.

11. A nozzle according to claim 1, wherein said insert comprises a rigid tubular portion defining said non-diverging section and connected to a wall of the diverging ring.

12. A nozzle for a thruster, comprising:

a first fixed nozzle portion;

at least a second nozzle portion in the form of a diverging ring displaceable between a retracted position in which said diverging ring surrounds said first nozzle portion and a deployed position in which said first diverging ring is connected to a downstream end of said first nozzle portion;

a deployment mechanism capable of causing said diverging ring to pass from said retracted position to said deployed position;

actuation means for actuating said deployment mechanism;

an insert disposed inside of said diverging ring so as to transform a diverging section of said diverging ring into a non-diverging section, at least over the major fraction of said diverging ring; and link means for connecting said insert to said diverging ring, said link means being made at least in part out of a material strength that is ephemeral in the combustion gas flowing through said diverging ring, so as to be eliminated after said diverging ring has come into said deployed position.

13. A nozzle according to claim 12, wherein said insert defines a section that is substantially cylindrical.

14. A nozzle according to claim. 12, wherein said actuation means comprises energy storage means that is not connected to an external energy source.

15. A nozzle according to claim 12, wherein said actuation means comprises spring devices.

16. A nozzle according to claim 12, wherein at least one spring element is interposed between an inside wall of said diverging ring and said insert for exerting a force on said insert having at least an axial component directed downstream so as to facilitate expulsion of said insert.

17. A nozzle according to claim 12, wherein said insert comprises a rigid tubular portion defining said non-diverging section and connected to a wall of said diverging ring.

18. A nozzle for a thruster, comprising:

a fixed nozzle portion;

at least a second nozzle portion in the form of a diverging ring displaceable between a retracted position in which said diverging ring surrounds said first nozzle portion and a deployed position in which said diverging ring is connected to a downstream end of said first nozzle portion;

a deployment mechanism capable of causing said diverging ring to pass from said retracted position to said deployed position;

actuation means for actuating said deployment mechanism;

an insert disposed inside of said diverging ring so as to transform a diverging section of said diverging ring into a non-diverging section, at least over the major fraction of the length of said diverging means; and a protective cover provided on an inside surface and an end surface of said insert, said protective cover being made out of a material that is ephemeral to the combustion gas flowing through said diverging ring, and said insert being made at least in part of a material of strength that is ephemeral in the combustion gas flowing through said diverging ring, so as to be eliminated after said diverging ring has come into said deployed position.

19. A nozzle according to claim 18, wherein said insert defines a section that is substantially cylindrical.

20. A nozzle according to claim 18, wherein said actuation means comprises energy storage means that is not connected to an external energy source.

21. A nozzle according to claim 18, wherein said actuation means comprises spring devices.

* * * * *

UNITED STATES PATENT AND TRADEMARK OFFICE
CERTIFICATE OF CORRECTION

PATENT NO.   : 6,418,710 B1
DATED        : July 16, 2002
INVENTOR(S)  : Bruno Perrier et al.

Page 1 of 1

It is certified that error appears in the above-identified patent and that said Letters Patent is hereby corrected as shown below:

Column 5,
Lines 10 and 50, "cylindrical" should read -- non-diverging --;
Line 62, "insert 20" should read -- insert --;

Column 6,
Line 63, "insert 80" should read -- insert 60 --;

Column 7,
Line 10, "120" should read -- 60 --;
Line 15, "cylindrical" should read -- non-diverging --;
Line 16, "124" should read -- 64 --; and
Line 16, "160" should read -- 126 --.

Signed and Sealed this

Fourth Day of November, 2003

JAMES E. ROGAN
*Director of the United States Patent and Trademark Office*